(12) United States Patent
Takamatsu (10) Patent No.: US 9,046,753 B2
(45) Date of Patent: Jun. 2, 2015

(54) PROJECTOR HAVING PLURAL LIGHT SOURCE BOXES EACH HAVING ASSOCIATED SOLID-STATE LIGHT SOURCE, PHOTODETECTOR, AND DRIVE UNIT

(75) Inventor: Hiroaki Takamatsu, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 232 days.

(21) Appl. No.: 13/699,246

(22) PCT Filed: May 28, 2010

(86) PCT No.: PCT/JP2010/059065
§ 371 (c)(1),
(2), (4) Date: Nov. 20, 2012

(87) PCT Pub. No.: WO2011/148498
PCT Pub. Date: Dec. 1, 2011

(65) Prior Publication Data
US 2013/0063705 A1    Mar. 14, 2013

(51) Int. Cl.
*G03B 21/20* (2006.01)
*H04N 9/31* (2006.01)
*G03B 33/06* (2006.01)

(52) U.S. Cl.
CPC .......... *G03B 21/2053* (2013.01); *H04N 9/3161* (2013.01); *G03B 21/2033* (2013.01);
(Continued)

(58) Field of Classification Search
CPC ............... G03B 21/20; G03B 21/2033; G03B 21/2053; G03B 21/206; G03B 33/06; G03B 33/10; G03B 33/12; H04N 9/31; H04N 9/3105; H04N 9/3155; H04N 9/3158; H04N 9/3164; H04N 9/3182; H04N 9/3191; H04N 9/3194

USPC ........ 353/30–31, 85, 94; 372/29.014–29.015, 372/34, 38.02, 38.07
See application file for complete search history.

(56) References Cited

U.S. PATENT DOCUMENTS 7,513,624 B2 * 4/2009 Yavid et al. ...................... 353/31
7,733,931 B2 * 6/2010 Kamijima ......................... 372/34
(Continued)

FOREIGN PATENT DOCUMENTS

JP    2004-163527 A    6/2004
JP    2005-189277 A    7/2005
(Continued)

OTHER PUBLICATIONS

International Search Report in PCT/JP2010/059065 dated Jul. 27, 2010(English Translation Thereof).

*Primary Examiner* — Jori S Reilly-Diakun
(74) *Attorney, Agent, or Firm* — McGinn IP Law Group, PLLC (57) ABSTRACT

A projector includes a plurality of light source boxes (1R, 1G, 1B) each accommodating at least one solid-state light source, emission colors of accommodated solid-state light sources being different from each other, a plurality of photodetectors (205c, 206c, 207c) that are provided within respective light source boxes and that detect light from the solid-state light sources, a plurality of drive units (202 to 204) that supply current to solid-state light sources (205b, 206b, 207b) provided within respective light source boxes, and a controller (201) that holds a reference value for the solid-state light source provided within each light source box for each emission color, that causes each drive to supply current to the solid-state light source provided within each light source box, and that adjusts the amount of current output from each drive unit such that the output value of each photodetector is at a reference value which corresponds to the emission color of the solid-state light source which is a corresponding target of light detection.

13 Claims, 7 Drawing Sheets

(52) U.S. Cl.
CPC .............. *G03B21/206* (2013.01); *G03B 33/06* (2013.01); *H04N 9/3155* (2013.01); *H04N 9/3158* (2013.01); *H04N 9/3164* (2013.01); *H04N 9/3194* (2013.01); *H04N 9/3105* (2013.01); *H04N 9/3182* (2013.01)

(56) References Cited

U.S. PATENT DOCUMENTS

| | | | |
|---|---|---|---|
| 7,926,950 B2 * | 4/2011 | Mizushima et al. | 353/31 |
| 7,959,303 B2 * | 6/2011 | Nishioka et al. | 353/85 |
| 7,967,452 B2 * | 6/2011 | Itoh et al. | 353/99 |
| 8,047,659 B2 * | 11/2011 | Sumiyama et al. | 353/85 |
| 8,342,694 B2 * | 1/2013 | Shibasaki | 353/85 |
| 2009/0323026 A1 * | 12/2009 | Mizushima et al. | 353/31 |
| 2010/0118283 A1 | 5/2010 | Aizawa et al. | |
| 2010/0128226 A1 * | 5/2010 | Shibasaki | 353/31 |
| 2011/0043764 A1 * | 2/2011 | Narikawa | 353/31 |

FOREIGN PATENT DOCUMENTS

| | | |
|---|---|---|
| JP | 2005-208231 A | 8/2005 |
| JP | 2008-193054 A | 8/2008 |
| JP | 2008-203316 A | 9/2008 |
| JP | 2008-234842 A | 10/2008 |
| JP | 2010-097177 A | 4/2010 |

* cited by examiner

PROJECTOR HAVING PLURAL LIGHT SOURCE BOXES EACH HAVING ASSOCIATED SOLID-STATE LIGHT SOURCE, PHOTODETECTOR, AND DRIVE UNIT

TECHNICAL FIELD

The present invention relates to a projector including a plurality of light sources with different emission light colors, and more particularly, to a projector having a function of adjusting the amount of light of the light sources of respective colors.

BACKGROUND ART

Projectors are known that use a solid-state light source such as an LED (Light Emitting Diode) as a light source of each of colors, red, green and blue. With these projectors, modulated light (image light), which is light from the solid-state light source of each color which has been spatially modulated, is projected on a screen to thereby display a color image.

Generally, the luminance (the amount of light) of a solid-state light source changes depending on the installation environment (particularly, the temperature), the changes over time in materials, and so on, but the degree of change in the luminance is different for the solid-state light source of each color. Thus, with the projectors described above, the luminance balance of the solid-state light source of each color changes depending on the installation environment, the changes over time in the materials for the solid-state light source, and so on, and as a result, the tone (white balance) of a white image (white light) projected on a screen is changed.

Patent Document 1 describes a light amount control device that is capable of providing an optimal white balance by adjusting the amount of light of an LED of each color of a projector including a plurality of LEDs that emit light different colors.

The projector described in Patent Document 1 includes a group of a plurality of red LEDs, a group of a plurality of green LEDs, and a group of a plurality of blue LEDs, and a driving current based on a set value is supplied to each group. The driving current is supplied in turn for each group.

The light amount control device includes one light detection element for detecting light output from the LED of each color, sampling means for acquiring light intensity of each group by sampling output from the light detection element in synchronization with supplying a driving current for each group, and feedback means for changing a set value of each group in such a way that the acquired light intensity of each group is at the reference value set for each group.

According to the light amount control device described above, the light intensity of each group is adjusted to be at the reference value set for each group, and thus, the tone (the white balance) of white light obtained by combining the light from the LEDs of respective groups can be maintained at an optimal value.

CITATION LIST

Patent Document

Patent Document 1: JP2004-163527A

DISCLOSURE OF THE INVENTION

However, the light amount control device described in Patent Document 1 is applied to a projector that displays an image of each of colors, red, green and blue in a time division manner, and is difficult to be applied to a projector that does not perform such time-division display.

For example, in the case of applying the light amount control device described in Patent Document 1 to a projector that includes a plurality of solid-state light sources of different emission colors and in which, according to which driving currents are simultaneously supplied to the solid-state light sources of respective colors and in which modulated light (image light), which is light from the solid-state light source of each color which has been spatially modulated, is projected on a screen, the light output from the solid-state light sources of respective colors enter one light detection element at the same time. The light detection element is not able to detect light from the solid-state light sources on a color-by-color basis, and thus, the light amount control described above cannot be realized.

The object of the present invention is to provide a projector that is capable of constantly providing an optimal white balance and that can be applied to various methods such as a time-division method and a method of simultaneously supplying driving currents to solid-state light sources of respective colors.

To achieve the object described above, a projector of the present invention is a projector that includes a plurality of light source boxes each of which is provided with at least one solid-state light source, emission colors of solid-state light sources provided within each light source box being different from each other, and the projector being constructed to project light emitted from each light source box, wherein a photodetector that detects light from the solid-state light source is provided within each of the light source boxes, and wherein the projector includes a plurality of drive units that supply power to the solid-state light sources provided within the respective light source boxes, and a controller that holds a reference value for the solid-state light source provided within each of the light source boxes for each emission color, that causes the plurality of drive units to supply power to the solid-state light sources provided within the respective light source boxes, and that adjusts amounts of power output from the plurality of drive units such that an output value of the photodetector within each of the light source boxes is at the reference value corresponding to the emission color of the solid-state light source that is a corresponding target of light detection.

DESCRIPTION OF SYMBOLS 1R, 1G, 1B Light source box
201 Controller
202 to 204 Drive unit
205a, 206a, 207a Housing
205b, 206b, 207b Solid-state light source
205c, 206c, 207c Photodetector

BEST MODE FOR CARRYING OUT THE INVENTION

Next, an exemplary embodiment will be described with reference to drawings.

First Exemplary Embodiment

Figure 1:
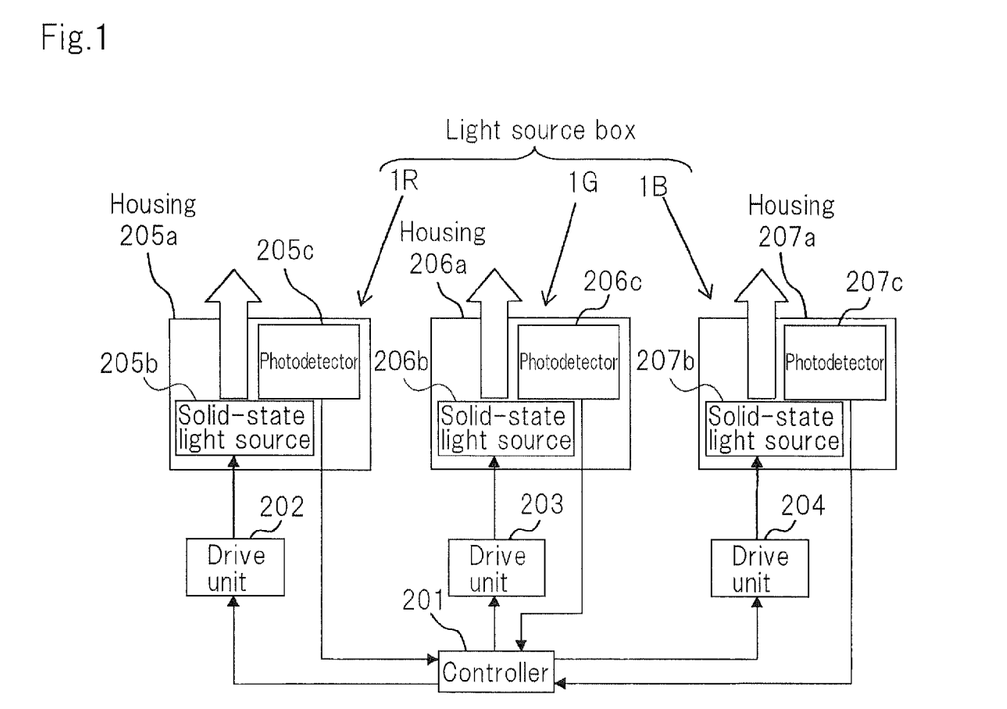
FIG. 1 is a block diagram showing a main structure related to light amount control of a projector which is a first exemplary embodiment.

FIG. 1 is a block diagram showing a main structure related to controlling the amount of light of a projector which is a first exemplary embodiment.

Referring to FIG. 1, the projector includes controller 201, drive units 202 to 204, and light source boxes 1R, 1G and 1B.

Light source box 1R includes housing 205a in which solid-state light source 205b and photodetector 205c that detects a part of light output from solid-state light source 205b are accommodated. The light from solid-state light source 205b is emitted to outside of housing 205a.

Light source box 1G includes housing 206a in which solid-state light source 206b and photodetector 206c that detects a part of light output from solid-state light source 206b are accommodated. The light from solid-state light source 206b is emitted to outside of housing 206a.

Light source box 1B includes housing 207a in which solid-state light source 207b and photodetector 207c that detects a part of light output from solid-state light source 207b are accommodated. The light from solid-state light source 207b is emitted to outside of housing 207a.

Solid-state light sources 205b, 206b and 207b are, for example, LEDs or semiconductor lasers, and the amount of light changes depending on the amount of driving current. For example, a red LED that emits red light is used as solid-state light source 205b, a green LED that emits green light is used as solid-state light source 206b, and a blue LED that emits blue light is used as solid-state light source 207b.

Photodetectors 205c, 206c and 207c are optical sensors (light level sensors) typified by photodiodes.

Drive unit 202 supplies a current to solid-state light source 205b according to instructions from controller 201. Drive unit 203 supplies a current to solid-state light source 206b according to instructions from controller 201. Drive unit 204 supplies a current to solid-state light source 207b according to instructions from controller 201.

Controller 201 holds a reference value of each of solid-state light sources 205b, 206b and 207b. Controller 201 causes a current to be supplied by drive unit 202 to solid-state light source 205b, and adjusts the amount of output current from drive unit 202 such that the output value (the detected light value) of photodetector 205c is at a corresponding reference value. The same control is also performed on solid-state light sources 206h and 207b.

Next, a basic structure related to image projection by the projector of the present exemplary embodiment will be described.

Figure 2:
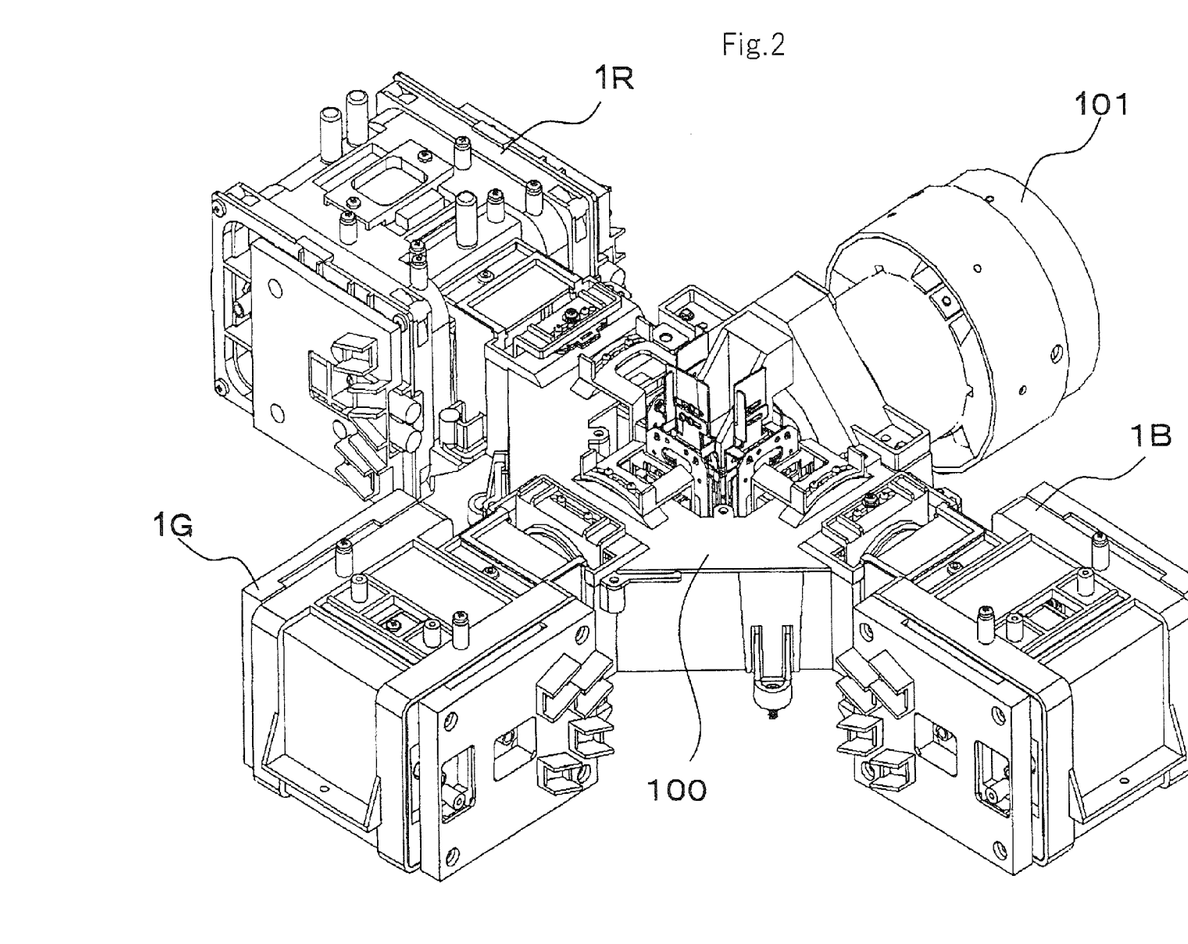
FIG. 2 is a perspective view schematically showing an example of an internal structure of the projector shown in FIG. 1.

An example of an internal structure of the projector of the present exemplary embodiment is shown in FIG. 2.

As shown in FIG. 2, the projector of the present exemplary embodiment includes image forming unit 100, three light source boxes 1R, 1G and 1B arranged at the periphery of image forming unit 100, and projection lens 101 for projecting an image formed by image forming unit 100.

Image forming unit 100 includes at least a cross dichroic prism, and first to third liquid crystal panels arranged at the periphery of the prism.

Driving currents are simultaneously supplied to solid-state light sources 205b, 206b and 207b. Light (red) from light source box 1R is emitted on the first liquid crystal panel. Light (green) from light source box 1G is emitted on the second liquid crystal panel. Light (blue) from light source box 1B is emitted on the third liquid crystal panel.

The first to third liquid crystal panels modulate the light emitted from light source boxes 1R, 1G and 1B based on a video signal. The light (image light) which has been modulated by the first to third liquid crystal panels is combined by the cross dichroic prism, and is projected on a screen or the like via projection lens 101.

Next, an operation related to adjusting the amount of light of the projector of the present exemplary embodiment will be described.

With the projector of the present exemplary embodiment, modulated light (image light), which is light from light source boxes 1R, 1G and 1B which has been spatially modulated, is projected, and also, controller 201 adjusts the amount of light such that the tone (the white balance) at the time of projection of a white image (white light) is maintained at an optimal value.

Figure 3:
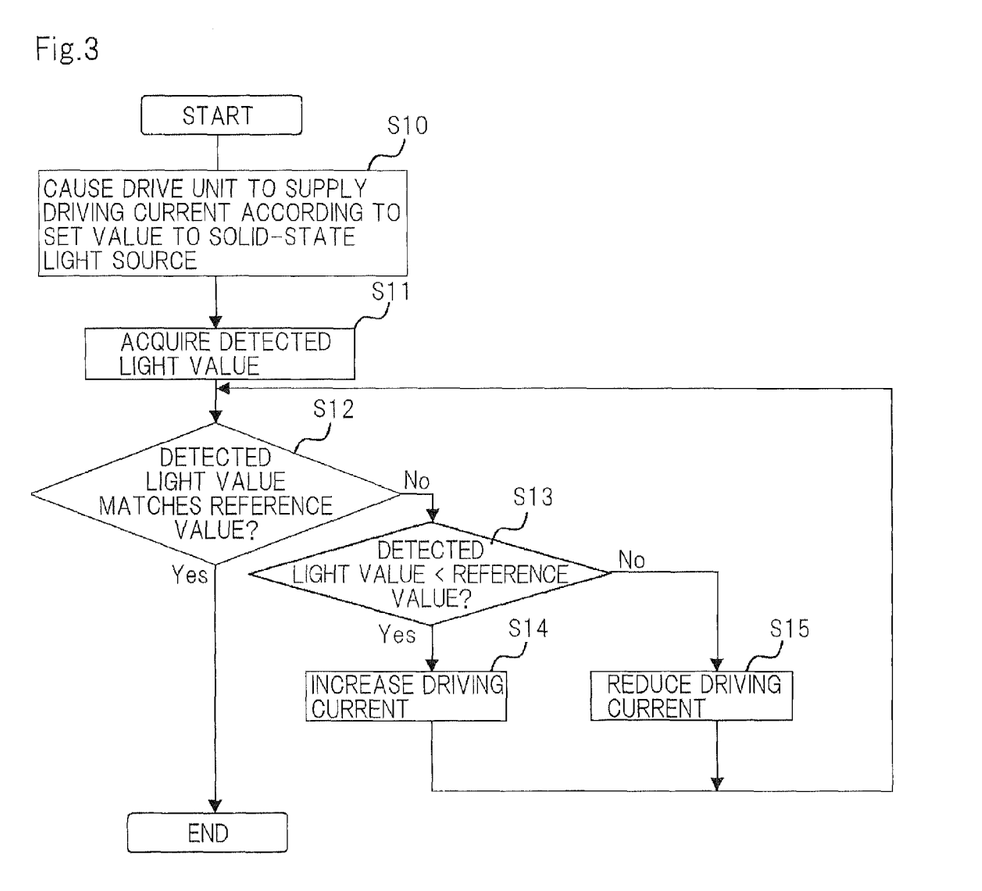
FIG. 3 is a flow chart showing a procedure for light amount adjustment performed by the projector shown in FIG. 1.

A procedure for adjusting the amount of light is shown in FIG. 3. Adjusting this amount of light is executed for each of solid-state light sources 205b, 206b and 207b. In the following, the amount of light that is adjusted for solid-state light source 205b will be specifically described with reference to FIGS. 1 and 2.

First, controller 201 supplies to drive unit 202 an instruction signal to the effect that a current according to a set value (an initial value) is to be supplied to solid-state light source 205b. In response to the instruction signal from controller 201, drive unit 202 supplies an amount of current to solid state to solid-state light source 205b (step S10) that is based on the set value (the initial value).

Next, controller 201 acquires an output value (a detected light value) of photodetector 205c (step S11), and compares the acquired detected light value to the reference value of solid-state light source 205b that has been held (step S12). When the detected light value matches the reference value, the process of the light amount adjustment is ended.

When the detected light value is different from the reference value, controller 201 determines whether or not the detected light value is less than the reference value (step S13).

When the detected light value is less than the reference value, controller 201 supplies to drive unit 202 an instruction signal to the effect that the amount of output current is to be increased by a predetermined amount. Drive unit 202 increases the amount of output current in response to the instruction signal from controller 201 (step S14).

When the detected light value is greater than the reference value, controller 201 supplies to drive unit 202 an instruction signal to the effect that the amount of output current is to be reduced by a predetermined amount. Drive unit 202 reduces the amount of output current in response to the instruction signal from controller 201 (step S15).

The determination of step S12 is performed again after step S14 or S15.

The light amount adjustment process of steps S10 to S15 described above is also performed on remaining solid-state light sources 206b and 207b. Additionally, controller 201 can perform the light amount adjustment process on solid-state light sources 205b, 206b and 207b in parallel during operation of the projector. Also, this light amount adjustment process may be constantly or regularly performed.

According to the projector of the present exemplary embodiment, since the amount of light of each of solid-state light sources 205b, 206b and 207b is maintained to be the amount of light corresponding to the reference value by the light amount adjustment process described above, light sources 205b, 206b and 207b can be maintained at a predetermined luminance balance. Accordingly, if a value allowing a desired white balance to be obtained is set as the reference value of each of solid-state light sources 205b, 206b and 207b, the desired white balance can be maintained regardless of the installation environment or the changes over time in the materials of the solid-state light sources.

Also, according to the projector of the present exemplary embodiment, housings 205a, 206a and 207a each function as light shielding means for shielding light from other light source boxes. For example, with respect to light source box 1R, only the light from solid-state light source 205b enters photodetector 205c, and light from other solid-state light sources 206b and 207b is shielded by housing 205a. Also with respect to light source boxes 1G and 1B, the same light shielding effect is achieved. Accordingly, even if driving currents are simultaneously supplied to solid-state light sources 205b, 206b and 207b, photodetectors 205c, 206c and 207c can accurately detect the light from solid-state light sources 205b, 206b and 207b, and an optimal white balance can be provided.

In the projector of the present exemplary embodiment described above, the number of solid-state light sources to be accommodated in each of light source boxes 1R, 1G and 1B may be one or more. Also, emission wavelengths of solid-state light sources accommodated in light source boxes 1R, 1G and 1B may be the same or different from each other.

When a plurality of solid-state light sources are accommodated in each of light source boxes 1R, 1G and 1B, photodetectors 205c, 206c and 207c may separately detect a part of the light from each solid-state light source, or may detect a part of combined light obtained by combining the light from each solid-state light source.

In the above-described case, controller 201 may hold a reference value of the solid-state light source for each emission color, cause each drive unit to supply a current to the solid-state light sources provided in each light source box, and adjust the amount of current output from each drive unit such that an output value of each photodetector is at the reference value corresponding to the emission color of the solid-state light source which is a corresponding target of light detection. In this case, controller 201 may refer to a memory that stores a table that indicates a correspondence relationship among a reference value of a solid-state light source, an emission color, and a drive unit.

Additionally, the drive unit may be provided for each emission color. In this case, current supply to a plurality of solid-state light sources of the same emission color is performed by one drive unit. Each drive unit increases or reduces the amount of output current according to instructions from controller 201.

Figure 4:
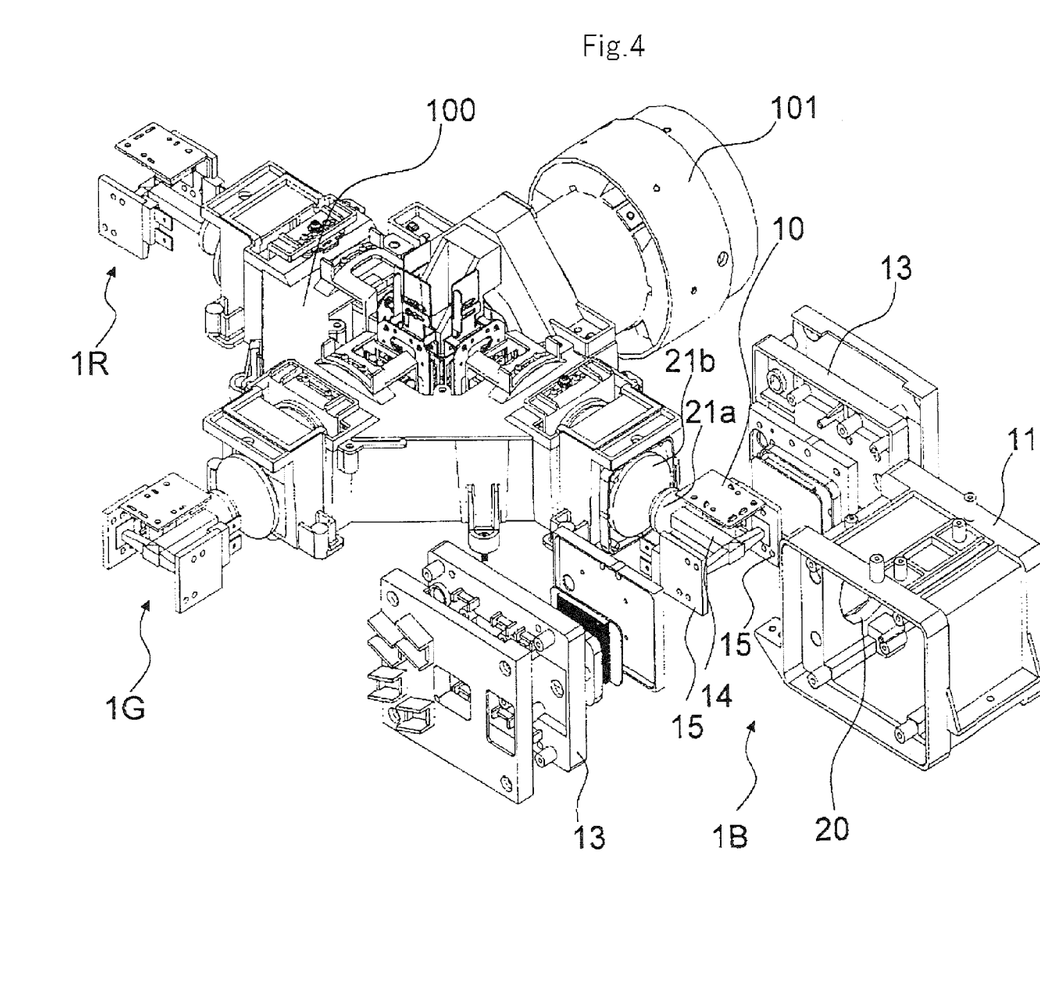
FIG. 4 is an exploded perspective view for explaining a structure of a light source box of the projector shown in FIG. 1.

FIG. 4 is an exploded perspective view for explaining the structure of light source boxes 1R, 1G and 1B accommodating two solid-state light sources. The structure of light source box 1B is shown in detail in FIG. 4, but other light source boxes 1R and 1G are basically structured in the same way as light source box 1B.

In the following, the structure of light source box 1B will be described in detail.

Referring to FIG. 4, housing 207a of light source box 1B includes main body 11 open at both sides, and a pair of side covers 13 that covers two opening portions 12, facing each other, of main body 11. Rod lens unit 14, two light source units 15, and light level sensor 10 are accommodated within housing 207a.

Figure 5:
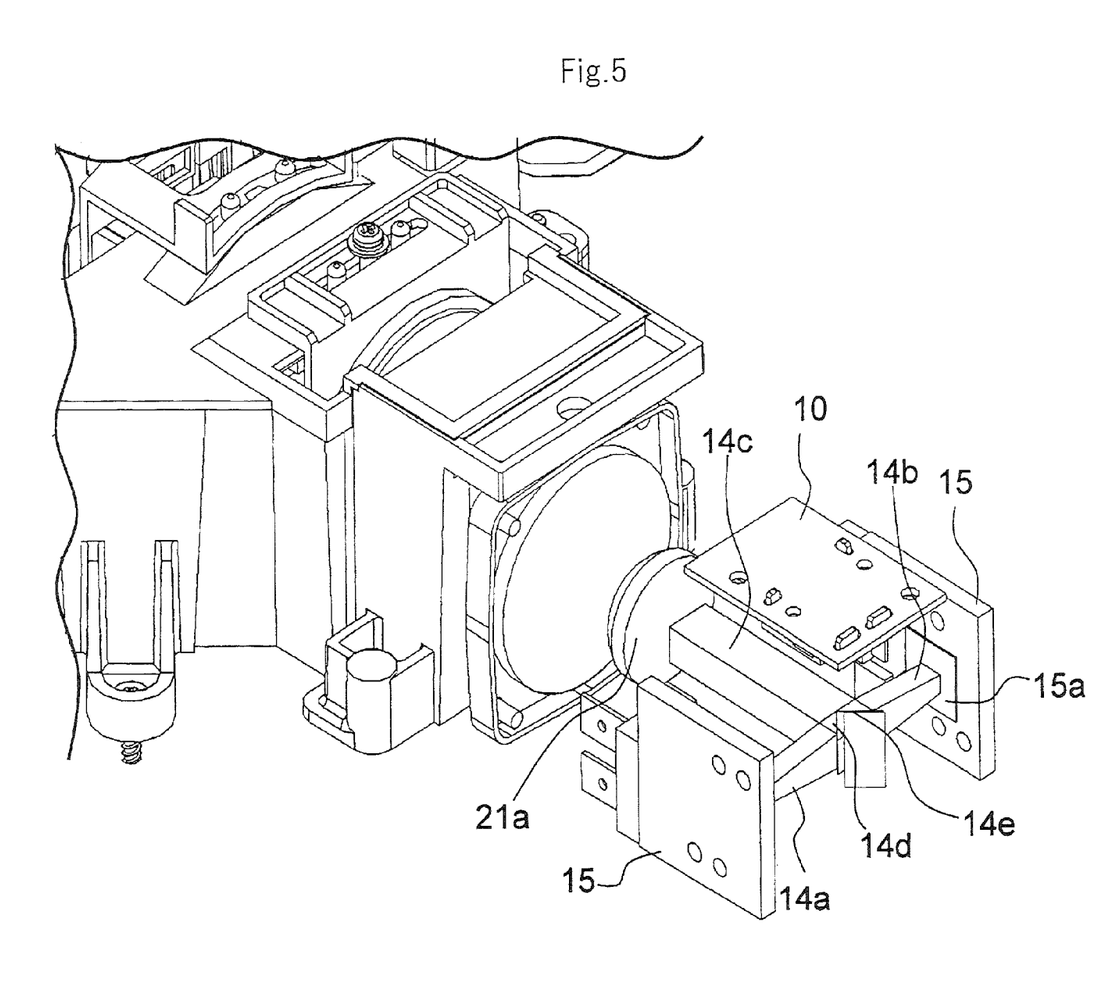
FIG. 5 is a schematic diagram showing an example of an internal structure of the light source box shown in FIG. 4.

Specific structures of rod lens unit 14, light source units 15, and light level sensor 10 are shown in FIG. 5.

As shown in FIG. 5, rod lens unit 14 includes rod lenses 14a to 14c, and prisms 14d and 14e, and these members are supported by a holder (not shown).

One end surface of rod lens 14a faces light emitting surface 15a of first light source unit 15, and one end surface of rod lens 14b faces light emitting surface 15a of second light source unit 15. The other end surface of rod lens 14a is optically coupled with one end surface of rod lens 14c via prism 14d. The other end surface of rod lens 14b is optically coupled with one end surface of rod lens 14c via prism 14e. The shape of a state where these rod lenses 14a to 14c are coupled is a T shape.

Reference is again made to FIG. 4. Mounting hole 20 is provided on the front surface of main body 11 (on the side of image forming unit 100), and condenser lens 21a is attached to mounting hole 20. The incident surface of condenser lens 21a faces the other end surface of rod lens 14c (see FIG. 5). Condenser lens 21b is provided at a position, facing condenser lens 21a, on the side of image forming unit 100. The optical axis of condenser lenses 21a and 21b coincides with the optical axis of rod lenses 14a to 14c (the axis passing through the centroid of the cross section of the rod).

Light level sensor 10 is arranged near rod lens 14c, and detects a part of spill light from rod lens 14c.

In light source box 1B described above, first and second light source units 15 each include a solid-state light source whose emission color is blue, and light (blue) from each light source unit 15 enters condenser lens 21a through rod lens unit 14. Light level sensor 10 detects a part of spill light (light obtained after light from each light source unit 15 is combined) from rod lens 14c of rod lens unit 14. The output from light level sensor 10 is supplied to controller 201 shown in FIG. 1.

Controller 201 supplies to drive unit 204 an instruction signal for increasing or reducing the amount of current, according to the difference between the detected light value of light level sensor 10 and the reference value. Drive unit 204 is commonly provided for each light source unit 15, and increases or reduces the amount of current supplied to each light source unit 15 according to instructions from controller 201.

Light source boxes 1R and 1G also have structures the same as that of light source box 1B, and the output of the light level sensor of each light source box is supplied to controller 201, and controller 201 carries out controlling the amount of current.

Additionally, in the structure shown in FIG. 4, the number of light source units to be accommodated in light source boxes 1R, 1G and 1B may be three or more. Also in this case, the light level sensor detects part of the combined light from respective light source units.

Also, in the structure shown in FIG. 4, when a plurality of light source units are accommodated in a light source box, the light level sensor may be provided for each light source unit, and each light level sensor may directly detect part of the light from a corresponding light source unit.

In the above-described case, the output of each light level sensor is supplied to controller 201 shown in FIG. 1. When a drive unit is commonly provided for each light source unit, controller 201 increases or reduces the amount of current supplied from the drive unit such that the sum (or the average value) of output values of respective light level sensors is at the reference value. When a drive unit is provided separately for each light source unit, controller 201 holds the reference value of each light source unit, acquires the detected light value of each light source unit from each light level sensor, and increases or reduces the amount of current supplied by the drive unit to a corresponding light source unit such that each detected light value is at a corresponding reference value.

Also, in the structure shown in FIG. 4, when a plurality of light source units are accommodated in the light source box and a plurality of light source units of different emission colors are accommodated in the same light source box, a color sensor capable of detecting the light of each emission color is used instead of the light level sensor. The color sensor detects parts of the light of different colors from the respective light source units or part of the combined light obtained by combining the light.

In the above-described case, the drive unit is provided separately for each light source unit, and the output of the color sensor (the detected light value for each color) is supplied to controller 201 shown in FIG. 1. Controller 201 holds the reference value of each of the light source units of different emission colors, acquires the detected light value of each light source unit from the color sensor, and increases or reduces the amount of current supplied by the drive unit such that each detected light value is at a corresponding reference value.

When adopting the structure described above, for example, in the structure shown in FIG. 4, two solid-state light sources whose emission color is red can be provided within light source box 1R, two solid-state light sources whose emission color is green can be provided within light source box 1G, and one solid-state light source whose emission color is blue and one solid-state light source whose emission color is green can be provided within light source box 1B. According to this structure, the following effects can be achieved.

Generally, in the case of obtaining white light with a good white balance by using a solid-state light source of a red color, a solid-state light source of a green color, and a solid-state light source of a blue color, and combining the light from the solid-state light sources of respective colors, when taking into account the color mixing ratio of red, green and blue light, the light output of the solid-state light source of a blue color is sufficient compared to other colors. On the other hand, the light output of the solid-state light source of a green color is insufficient compared to other colors. In this case, if the amounts of light of the solid-state light sources of blue and red colors are suppressed in accordance with the light amount of the solid-state light source of a green color, the amount of white light obtained is also reduced.

According to the structure described above, green light is increased. Therefore, the three primary colors can be combined in an optimal color mixing ratio, and white light with a good white balance can be obtained. In addition, the light outputs of the solid-state light sources of three colors can be prevented from being suppressed and can be maximized.

In the example described above, the solid-state light source of a green color is accommodated in light source box 1B, but the solid-state light source of a green color may be accommodated in light source box 1R instead. That is, it is possible to have one solid-state light source of a red color and one solid-state light source of a green color provided within light source box 1R, two solid-state light sources of a green color provided within light source box 1G, and two solid-state light sources of a blue color provided within light source box 1B.

Furthermore, when three or more solid-state light sources are provided in each of light source boxes 1R, 1G and 1B, a solid-state light source of a green color may be provided in both light source boxes 1R and 1B.

With the projector of the present exemplary embodiment, there are cases where the output of the light level sensor or the color sensor is saturated, and the light from the solid-state light source cannot be accurately detected. To avoid this problem, an opening member including an opening that restricts the amount of incident light on a light receiving surface may be provided at a position facing the light receiving surface of the light level sensor or the color sensor.

Figure 6:
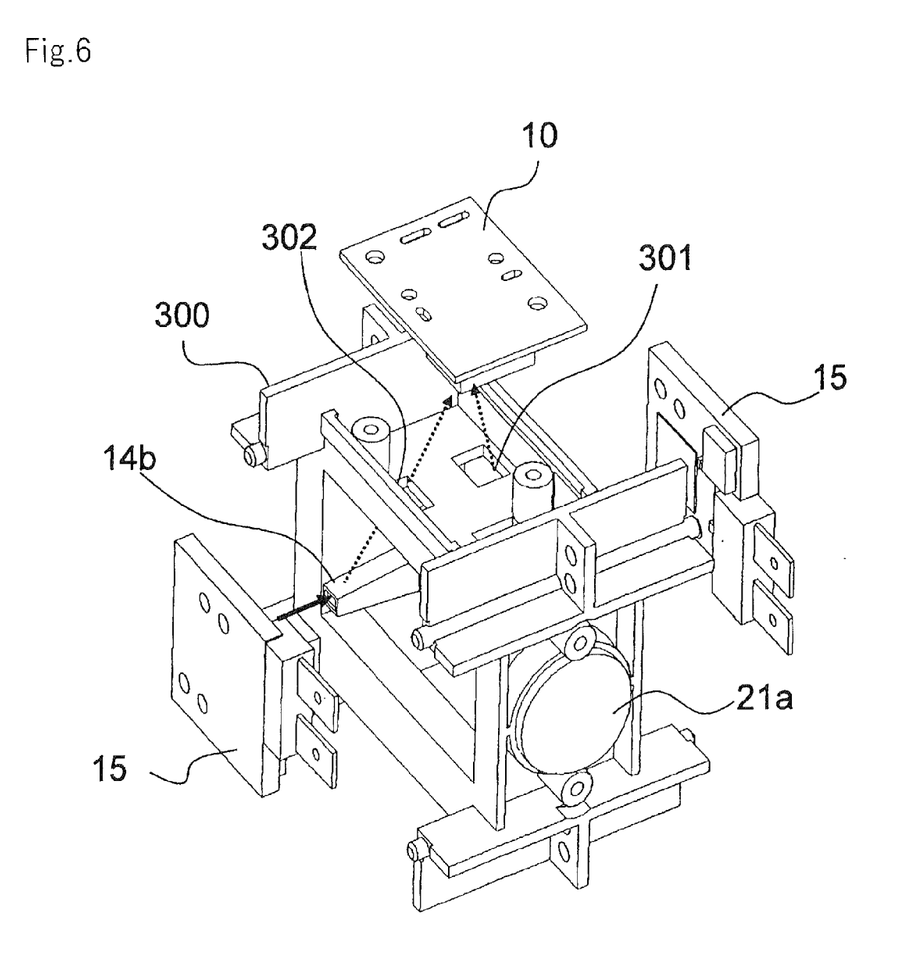
FIG. 6 is a schematic diagram showing an example of a structure of a light source box provided with an opening member.
Figure 7:
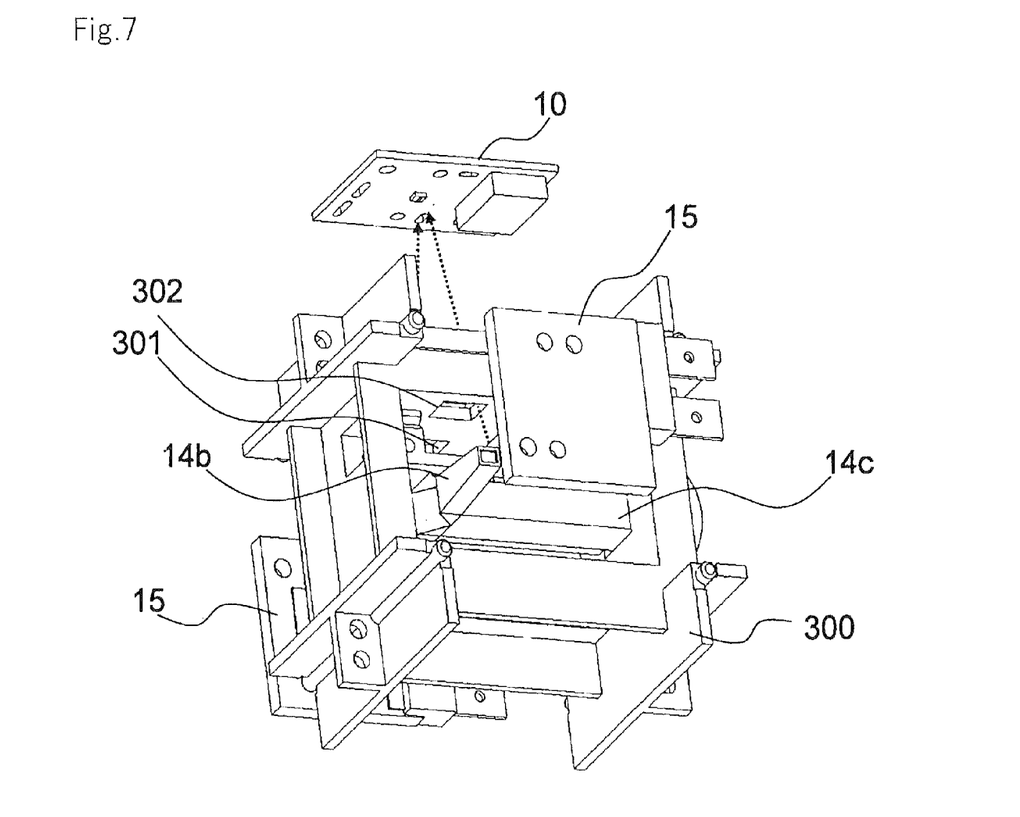
FIG. 7 is a schematic diagram showing an example of a structure of the light source box with an opening member.

An example of the internal structure of a light source box adopting an opening member is shown in FIGS. 6 and 7. FIG. 6 shows a state where holder 300 for holding rod lens unit 14 is seen obliquely from the upper side on the side of lens 21a, and FIG. 7 shows a state where holder 300 is seen from another angle on the opposite side of lens 21a.

In the example shown in FIGS. 6 and 7, an opening member is structured by a part of holder 300 holding rod lens unit 14. Openings 301 and 302 are formed in a region, on a side portion of holder 300 on the side of light level sensor 10, facing rod lenses 14a and 14b.

A part of light entering rod lens 14a from first light source unit 15 spills from rod lens 14a, and a part of the spill light reaches the light receiving surface of light level sensor 10 through opening 301.

A part of light entering rod lens 14b from second light source unit 15 spills from rod lens 14b, and a part of the spill light reaches the light receiving surface of light level sensor 10 through opening 302.

Light level sensor 10 detects a part of the spill light from rod lenses 14a and 14b through openings 301 and 302.

According to the structure described above, the amount of incident spill light on the light receiving surface of light level sensor 10 can be adjusted by the positions and the sizes of openings 301 and 302. The greater the output of light source unit 15, the smaller are openings 301 and 302. Saturation of the output of light level sensor 10 can thereby be suppressed.

When the emission colors of first and second light source units 15 differ from each other in the structure shown in FIGS. 6 and 7, a color sensor is used instead of light level sensor 10.

The color sensor includes first and second light receiving surfaces, and first and second filters provided at positions facing the first and second light receiving surfaces. The first filter has a property of letting through the wavelength band of the emission color of first light source unit 15 and reflecting or absorbing other wavelength bands. The second filter has a property of letting through the wavelength band of the emission color of second light source unit 15 and reflecting or absorbing other wavelength bands.

A part of light entering rod lens 14a from first light source unit 15 spills from rod lens 14a, and a part of the spill light is supplied to the color sensor through opening 301. At the color sensor, light from opening 301 enters the first light receiving surface through the first filter.

On the other hand, a part of light entering rod lens 14b from second light source unit 15 spills from rod lens 14b, and a part of the spill light is supplied to the color sensor through opening 302. At the color sensor, light from opening 302 enters the second light receiving surface through the second filter.

The color sensor outputs a detected light value for each light receiving surface. First and second detected light values from the color sensor are supplied to controller 201 shown in FIG. 1.

According to the structure described above, the amount of incident spill light on the first and second light receiving surfaces of the color sensor can be adjusted by the positions and the sizes of openings 301 and 302. When high-output light source unit 15 is used, saturation of respective outputs (the first and second detected light values) of the color sensor can be suppressed by making openings 301 and 302 smaller.

Additionally, in the example shown in FIGS. 6 and 7, light level sensor 10 (or the color sensor) is structured to detect a part of spill light from rod lenses 14a and 14b, but it may also be structured to detect a part of spill light from rod lens 14c. In this case, an opening is formed in a region on a side portion of holder 300 on the side of light level sensor 10 (or the color sensor), facing rod lens 14c. The spill light from rod lens 14c is supplied to the light receiving surface of light level sensor 10 (or the first and second light receiving surfaces of the color sensor) through the opening.

Also in the case described above, when high-output light source unit 15 is used, saturation of output(s) of light level sensor 10 or the color sensor (the first and second detected light values) can be suppressed by making the opening smaller.

Also, as another measure to be taken in the case of using high-output light source unit 15, an ND filter may be arranged at a position facing the light receiving surface of light level sensor 10 (or the first and second light receiving surfaces of the color sensor).

Furthermore, in the projector of the present exemplary embodiment, the following structure may be adopted.

First and second red solid-state light sources that output red light are accommodated in light source box 1R, first and second green solid-state light sources that output green light are accommodated in light source box 1G, and one each of blue solid-state light source that outputs blue light and third green solid-state light source that outputs green light are accommodated in light source box 1B.

A first light level sensor is provided within light source box 1R. The first light level sensor detects the red light output from each of the first and second red solid-state light sources provided within light source box 1R.

A second light level sensor is provided within light source box 1G. The second light level sensor detects the green light output from each of the first and second green solid-state light sources provided within light source box 1G.

A color sensor is provided within light source box 1B. The color sensor detects the blue light from the blue solid-state light source and the green light from the third green solid-state light source, and outputs first and second output values.

First to sixth drive units are provided one-to-one to the first and second red solid-state light sources, the first to third green solid-state light sources, and the blue solid-state light source.

The first and second drive units supply current to the first and second red solid-state light sources provided within light source box 1R. The third and fourth drive units supply current to the first and second green solid-state light sources provided within light source box 1G. The fifth drive unit supplies current to the third green solid-state light source provided within light source box 1B. The sixth drive unit supplies current to the blue solid-state light source provided within light source box 1B.

Controller 201 holds a first reference value set for the first and second red solid-state light sources, a second reference value set for the first to third green solid-state light sources, and a third reference value set for the blue solid-state light source.

Controller 201 adjusts the amounts of current output from the first and second drive units such that output values of the first light level sensor are at the first reference value, adjusts the amounts of current output from the third and fourth drive units such that output values of the second light level sensor are at the second reference value, adjusts the amount of current output from the fifth drive unit such that the first output value of the color sensor is at the second reference value, and adjusts the amount of current output from the sixth drive unit such that the second output value of the color sensor is at the third reference value.

Furthermore, when an LED is used as the solid-state light source in the projector of the present exemplary embodiment, since the quantum efficiency of an LED is low, most of electrical energy input to the LED is converted into heat. Thus, if the amount of driving current is increased, the amount of heat generation increases and the luminous efficiency is reduced. Also, the LED may be thermally destructed. Accordingly, to realize a light source box of high brightness, it is necessary to provide means for efficiently cooling the LED.

In the following, the structure of a light source box provided with a cooling structure will be described.

In light source boxes 1R, 1G and 1B shown in FIGS. 4 and 5, two opening portions 12 of main body 11 that face each other are each covered in an airtight fashion by cover 13, and a cooling unit is accommodated within the box.

First and second light source units 15 each include an LED light source and a holder on which the LED light source is mounted. The cooling unit is provided for each light source unit 15.

The cooling unit provided in first light source unit 15 includes a first cooling member that is in contact with the holder of first light source unit 15, and a second cooling member that is in contact with the first cooling member. The first cooling member is a Peltier device, for example. The second cooling member is a sheet-shaped member having a coolant channel formed therewithin. Supplying of a coolant to the coolant channel is performed by coolant supply means provided outside light source box.

The holder is fixed to cover 13 by a fixing member in a state of holding the cooling unit between the holder and cover 13. A heat insulation member is interposed between the holder and the fixing member, and a layer of air is provided between the outer circumferential surface of the holder and the inner circumferential surface of main body 11. Heat insulation between a light source unit to be cooled by the cooling unit and a housing is thereby achieved.

The cooling unit provided in second light source unit 15 has the same structure as that described above.

According to the structure using the cooling unit described above, an LED can be cooled. In addition, when an LED element or a substrate on which an LED element is mounted is cooled, condensation occurs. But according to the cooling unit described above, such occurrence of condensation can be prevented.

The projector described above simultaneously drives the solid-state light source accommodated in each light source box, but the present invention is not limited to such. The projector of the present invention can also drive the solid-state light source accommodated in each light source box in a time division manner for each emission color.

In the following, a structure of a projector will be described in a case in which a time division method is adopted.

In a time division manner, image forming unit 100 in the structure shown in FIG. 2 includes at least a cross dichroic prism for combining light from each of light source boxes 1R, 1G and 1B, and one liquid crystal panel to be irradiated by the light combined by the cross dichroic prism.

Controller 201 drives the solid-state light sources accommodated in light source boxes 1R, 1G and 1B in turn for each light source box, based on a video signal input from the outside, and also, causes red, green and blue images based on the input video signal to be displayed on a liquid crystal panel in turn. Red, green and blue images are thereby projected in turn.

Also with the time division projection described above, controller 201 carries out adjusting the amount of light. Adjusting the amount of light is carried out simultaneously with driving the accommodated solid-state light source for each light source box.

Second Exemplary Embodiment

In the projector of the first exemplary embodiment described above, adjusting the amount of light is carried out by controlling the amount of current supplied to a solid-state light source to be at a reference value, but the present invention is not limited to such. The amount of light can also be adjusted by driving the solid-state light source by PWM (Pulse Width Modulation) control. Here, a projector in which PWM control is used to adjust the amount of light will be described as the second exemplary embodiment.

The projector of the present exemplary embodiment is structured in the same manner as the projector of the first exemplary embodiment described above, except for the solid-state light source that is driven by PWM control.

In the light amount adjustment using PWM control, a drive unit supplies a PWM signal (a pulse signal) to a solid-state light source according to instructions from a controller. At the solid-state light source, the turn-on time and the turn-off time are controlled according to the PWM signal. In this case, the values of the current and voltage supplied to the solid-state light source in a turned on state are constant. The controller adjusts the pulse width indicating a turn-on time of the PWM signal such that the output value of a photodetector is at a reference value. Here, the output value of a photodetector (the detected light value) is the average value of output values per unit time (per a predetermined time).

In the following, the structure and operation of the projector of the present exemplary embodiment will be specifically described with reference to FIGS. 1 and 3.

In the structure shown in FIG. 1, drive unit 202 supplies a PWM signal to solid-state light source 205b according to instructions from controller 201. Drive unit 203 supplies a PWM signal to solid-state light source 206b according to instructions from controller 201. Drive unit 204 supplies a PWM signal to solid-state light source 207b according to instructions from controller 201.

Controller 201 holds a reference value of each of solid-state light sources 205b, 206b and 207b. Controller 201 causes a PWM signal to be supplied from drive unit 202 to solid-state light source 205b, and adjusts the pulse width indicating a turn-on time (a turn-on duration) of the PWM signal such that an output value (a detected light value) of photodetector 205c is at a corresponding reference value. The same control is performed on solid-state light sources 206b and 207b.

The light amount adjustment using PWM control is performed based on the same procedure as the procedure shown in FIG. 3. However, instead of adjusting the amount of current supplied to solid-state light source, adjusting the pulse width of a PWM signal is performed.

First, controller 201 supplies to drive unit 202 an instruction signal to the effect that a PWM signal having a pulse width according to a set value (an initial value) will be supplied to solid-state light source 205b. In response to the instruction signal from controller 201, drive unit 202 supplies the PWM signal to solid-state light source 205b (step S10).

Next, controller 201 acquires an output value (a detected light value) of photodetector 205c (step S11), and compares the acquired detected light value to the reference value of solid-state light source 205b that it holds (step S12). When the detected light value matches the reference value, the process of the light amount adjustment is ended.

When the detected light value is different from the reference value, controller 201 determines whether or not the detected light value is less than the reference value (step S13).

When the detected light value is less than the reference value, controller 201 supplies to drive unit 202 an instruction signal to the effect that the pulse width (the turn-on duration) of the PWM signal has increased by a predetermined amount. Drive unit 202 increases the pulse width (the turn-on duration) of the PWM signal in response to the instruction signal from controller 201 (step S14).

When the detected light value is greater than the reference value, controller 201 supplies to drive unit 202 an instruction signal to the effect that the pulse width (the turn-on duration) of the PWM signal is to be reduced by a predetermined amount. Drive unit 202 reduces the pulse width (the turn-on duration) of the PWM signal in response to the instruction signal from controller 201 (step S15).

The determination of step S12 is performed again after steps S14 and S15.

The process of adjusting the amount of light in steps S10 to S15 described above is also performed on remaining solid-state light sources 206b and 207b. Additionally, controller 201 can carry out the process of adjusting the amount of light on solid-state light sources 205b, 206b and 207b in parallel during operation of the projector. Also, this process of adjusting the amount of light may be continuously or periodically executed.

According to the projector of the present exemplary embodiment, as with the projector of the first exemplary embodiment described above, since the amount of light of each of solid-state light sources 205b, 206b and 207b is maintained to be the amount of light corresponding to the reference value, light sources 205b, 206b and 207b can be maintained at a predetermined luminance balance. Accordingly, if a value that enables a desired white balance to be obtained is set as the reference value of each of solid-state light sources 205b, 206b and 207b, the desired white balance can be maintained regardless of the installation environment or the changes over time in the materials of the solid-state light sources.

The structure and the changes to the projector of the first exemplary embodiment described above can all be applied to the projector of the present exemplary embodiment described above.

Another Exemplary Embodiment

A projector of another exemplary embodiment is a projector that includes a plurality of light source boxes each of which is provided with at least one solid-state light source, emission colors of solid-state light sources provided within each light source box being different from each other, and the projector being constructed to project light emitted from each light source box, wherein a photodetector that detects light from the solid-state light source is provided within each of the light source boxes, and wherein the projector includes a plurality of drive units that supply power to the solid-state light sources provided within the respective light source boxes, and a controller that holds a reference value for the solid-state light source provided within each of the light source boxes for each emission color, that causes the plurality of drive units to supply power to the solid-state light sources provided within the respective light source boxes, and that adjusts amounts of power output from the plurality of drive units such that an output value of the photodetector within each of the light source boxes is at the reference value corresponding to the emission color of the solid-state light source that is a corresponding target of light detection.

With the projector of this other exemplary embodiment, adjusting the amount of power to be supplied to a solid-state light source is performed by adjusting the amount of current or PWM control.

The structure for performing the adjustment of the amount of power by the adjustment of the amount of current is the same as the structure of the first exemplary embodiment described above. The structure for performing the adjustment of the amount of power by PWM control is the same as the structure of the second exemplary embodiment described above. With these adjustments of the amount of power, the amount of power per unit time (per a predetermined time) is adjusted.

The projector of each exemplary embodiment described above simultaneously drives the solid-state light source accommodated in each light source box, but the present invention is not limited to such. The projector of the present invention can also drive the solid-state light source accommodated in each light source box in a time division manner for each emission color.

Furthermore, the projector of each exemplary embodiment is an example of the present invention, and its structure is not limited to that shown in the drawings, and it is appreciated that those skilled in the art can make modifications in the technical field to which the invention pertains without departing from the scope of the invention.

According to the projector of the present invention described above, an optimal white balance can be constantly provided using various methods such as a time-division method and a method of simultaneously supplying driving currents to solid-state light sources of respective colors.

What is claimed is:

1. A projector comprising a plurality of light source boxes each of which is provided with at least one solid-state light source, emission colors of solid-state light sources provided in each light source being different from each other, and the projector being constructed to project light emitted from each light source box, wherein a photodetector that detects light from the solid-state light source is provided within each of said light source boxes, and wherein the projector includes a plurality of drive units that supply power to the solid-state light sources provided within said respective light source boxes, and a controller that holds a reference value for the solid-state light source provided within each of said light source boxes for each emission color, that causes said plurality of drive units to supply power to the solid-state light sources provided within said respective light source boxes, and that adjusts amounts of power output from said plurality of drive units such that an output value of the photodetector within each of said light source boxes is at the reference value corresponding to the emission color of the solid-state light source that is a corresponding target of light detection, wherein said plurality of light source boxes include a first light source box accommodating first and second red solid-state light sources that output red light, a second light source box accommodating first and second green solid-state light sources that output green light, a third light source box accommodating both a blue solid-state light source that outputs blue light and a third green solid-state light source that outputs green light, a first light level sensor, as the photodetector, that is provided within the first light source box and that detects red light output from each of the first and second red solid state light sources, a second light level sensor, as the photodetector, that is provided within the second light source box and that detects green light output from each of the first and second green solid-state light sources, and a color sensor, as the photodetector, that is provided within the third light source box and that outputs first and second output values by detecting green light and blue light respectively from the third green solid-state light source and the blue solid-state light source, wherein said plurality of drive units include first to sixth drive units that are provided one-to-one to the first and second red solid-state light sources, to the first to third green solid-state light sources, and to the blue solid-state light source, and that supply power to corresponding solid-state light sources, and wherein said controller holds a first reference value set for the first and second red solid-state light sources, a second reference value set for the first to third green solid-state light sources, and a third reference value set for the blue solid-state light source, adjusts amounts of power output from the first and second drive units such that output values of the first light level sensor are at the first reference value, adjusts amounts of power output from the third and fourth drive units such that output values of the second light level sensor are at the second reference value, adjusts an amount of power output from the fifth drive unit such that the first output value of the color sensor is at the second reference value, and adjusts an amount of power output from the sixth drive unit such that the second output value of the color sensor is at the third reference value.

2. The projector according to claim 1, wherein each of said light source boxes further accommodates an optical element that combines light from each solid-state light source accommodated in the light source box, and wherein the light level sensor detects spill light from the optical element within the light source box accommodating the light level sensor.

3. The projector according to claim 2, wherein each of said light source boxes further accommodates an opening member including an opening, and the opening of the opening member is arranged at a position facing a light receiving surface of the light level sensor accommodated within the light source box.

4. The projector according to claim 2, wherein said plurality of drive units are provided, corresponding one-to-one to said plurality of light source boxes, and each of said plurality of drive units commonly supplies power to each solid-state light source accommodated within a corresponding light source box.

5. The projector according to claim 2, wherein said plurality of drive units supply currents to corresponding solid-state light sources, and amounts of the supplied currents are adjusted based on instructions from said controller.

6. The projector according to claim 1, wherein each of said light source boxes further accommodates an opening member including an opening, and the opening of the opening member is arranged at a position facing a light receiving surface of the light level sensor accommodated within the light source box.

7. The projector according to claim 6, wherein said plurality of drive units are provided, corresponding one-to-one to said plurality of light source boxes, and each of said plurality of drive units commonly supplies power to each solid-state light source accommodated within a corresponding light source box.

8. The projector according to claim 6, wherein said plurality of drive units supply currents to corresponding solid-state light sources, and amounts of the supplied currents are adjusted based on instructions from said controller.

9. The projector according to claim 1, wherein said plurality of drive units are provided, corresponding one-to-one to said plurality of light source boxes, and each of said plurality of drive units commonly supplies power to each solid-state light source accommodated within a corresponding light source box.

10. The projector according to claim 9, wherein said plurality of drive units supply currents to corresponding solid-state light sources, and amounts of the supplied currents are adjusted based on instructions from said controller.

11. The projector according to claim 1,
wherein the color sensor includes a first light receiving surface that receives green light, and a second light receiving surface that receives blue light, and
wherein the first light source box further accommodates an opening member including first and second openings, the first opening being provided at a position facing the first light receiving surface and the second opening being provided at a position facing the second light receiving surface.

12. The projector according to claim 1, wherein said plurality of drive units supply currents to corresponding solid-state light sources, and amounts of the supplied currents are adjusted based on instructions from said controller.

13. The projector according to claim 1, wherein said plurality of drive units supply to corresponding solid-state light sources pulse signals having pulse widths indicating turn-on times of the solid-state light sources, and the pulse widths of the pulse signals are adjusted based on instructions from said controller.

* * * * *